March 19, 1963   J. GLASS   3,081,620
INSTRUMENT CASEMENT LEAK TESTING DEVICE
Filed July 19, 1960
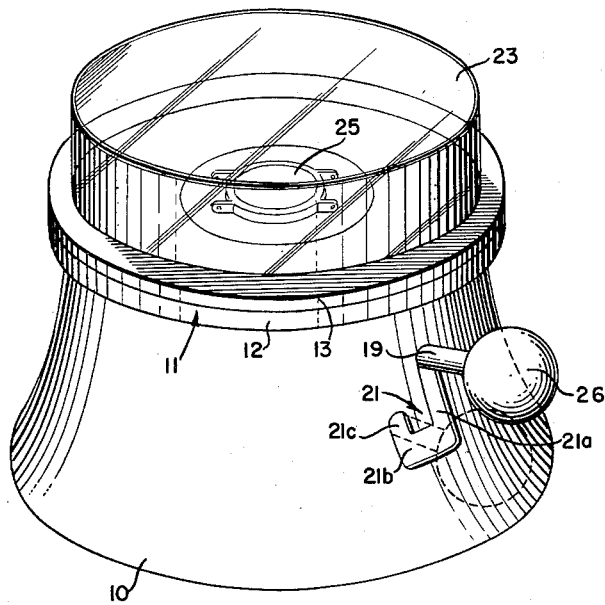
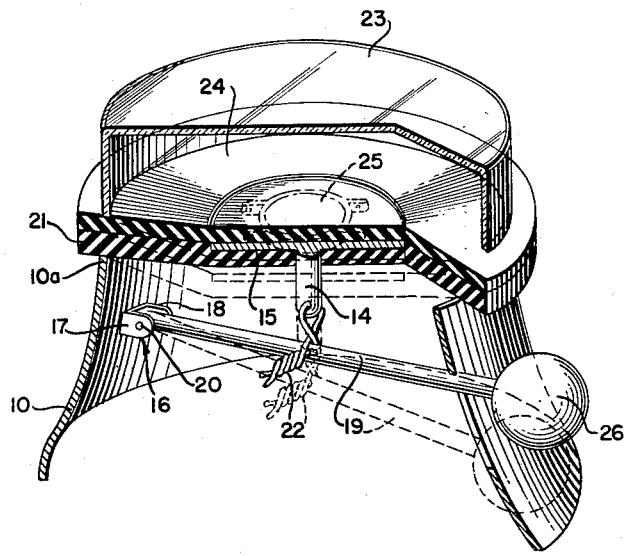
INVENTOR
Jerrold Glass
BY Wilkinson, Mawhinney & Theibautt
ATTORNEY

United States Patent Office 3,081,620
Patented Mar. 19, 1963

3,081,620
INSTRUMENT CASEMENT LEAK TESTING
DEVICE
Jerrold Glass, 10 Randall Ave., Pikesville, Md.
Filed July 19, 1960, Ser. No. 43,875
1 Claim. (Cl. 73—40)

The present invention relates to an instrument casement leak testing device and is a continuation-in-part of my similarly entitled copending application, Serial No. 740,824, filed June 9, 1958, now abandoned, and has for an object to provide a simple portable inexpensive device for testing instrument casements, which must be water-tight, for leaks without having to immerse the casement in a liquid under pressure thereby running the risk that should the casement not be sealed the liquid would enter the inner chamber of the casement and damage the works of the instrument therein.

Another object of the present invention is to provide a new method and apparatus for testing the seal of water-tight casements which consists of coating the sealed casement with a bubble producing substance and causing a pressure drop outside of the casement whereby the pressure in the casement is thereby greater and should an improper seal be present the greater pressure inside the casement escaping to the outside low pressure area would cause a localized bubbling action in the area of improper seal thereby indicating the area to be corrected.

A further object of the present invention is to provide a simple compact device for testing such casements as water-tight watches, compasses or any other instrument placed in a casement which must be water-tight. Heretofore it has been customary to immerse the instrument in a liquid under pressure with the attendant risk that should the seal of the casement be faulty the liquid would enter the works chamber injuring the works therein.

Every time a water-tight, or so-called waterproof watch is repaired the casement to be again considered and certified to be waterproof must be tested. The device of the present invention is a simple and inexpensive way of accomplishing this result.

With the foregoing and other objects in view, the invention will be more fully described hereinafter, and will be more particularly pointed out in the claim appended hereto.

In the drawings, wherein like symbols refer to like or corresponding parts throughout the several views:

FIGURE 1 is a perspective view of a device constructed in accordance with the present invention.

FIGURE 2 is a view similar to FIGURE 1 having parts broken away and parts shown in section.

Referring to FIGURES 1 and 2, 10 designates a hollow base member for supporting thereon a diaphragm 11 which consists of two rubber or plastic flexible disc members 12 and 13. The diameter of these disc members exceeds the upper diameter 10a of the hollow base member 10. The lower disc member 12 has an opening through the center thereof to permit the passage therethrough of a stub shaft 14 which is secured to a metal disc 15 lying between the two flexible disc members 12 and 13. The two flexible disc members 12 and 13 are bonded together after the disc 15 has been placed therebetween.

Inside the hollow base member 10 is provided a U-shaped member 16 having leg portions 17 and 18 to which an operating lever 19 is pivoted at 20. The free end of the lever 19 extends through a J-shaped opening, designated generally at 21, and having a major leg portion 21a, a base 21b and an upturned or hooked end 21c. The stub shaft 14 is secured to the operating lever 19 by a twisted wire pivotal connection 22. The wire connection pivots at both the stub shaft 14 and the operating lever 19.

A visual vacuum cover 23 in the form of a Petri dish is shown for defining with the deformable rubber disc members 12 and 13, a vacuum chamber 24. I have found that for the testing of watch casements that Petri dishes under 100 mm. in diameter and 20 mm. in depth do not afford a sufficient vacuum area.

When a casement is to be tested, the casement 25 is coated with a bubble producing substance, for example, a soapy solution, and it is placed upon the top disc or diaphragm member 12 and the Petri dish 23 is inverted thereover, as shown in FIGURES 1 and 2, so that the rim of the Petri dish seats against the rubber flexible diaphragm 12. The operator then grasps the knob 26 on the lever 19, pressing it downwardly in the slot 21a and transversely across the base slot 21b and allows the shaft 19 to seat in the socket or upturned end 21c of the slot 21 to maintain the vacuum pulled by the downward motion of the lever 19. The downward motion of the lever 19 through the wire connection to the stub shaft 14 causes the diaphragm members 12 and 13 to be deflected to the dotted position shown in FIGURE 2 which causes a pressure drop within the chamber 24 whereby the pressure outside the casement 25 is lower than the pressure within the casement 25 which will cause, in the event of a leak in the casement connections, a bubbling action of the bubble producing substance on the casement in the area of the leak so that the watchmaker will know where improper seating of water-tight casements is occurring.

Although I have disclosed herein the best form of the invention known to me at this time, I reserve the right to all such modifications and changes as may come within the scope of the following claim.

What is claimed is:

For use with a casement the joints of which have been coated with a bubble producing substance to reveal leaks, an instrument casement leak testing device comprising a hollow base member having an upper opening and having a J-shaped slot through a wall of said base member, a pair of circular deformable rubber discs greater in diameter than the upper opening in said hollow base member, one of said rubber disc members having an opening through the center thereof, a metallic disc between said rubber discs and of a diameter less than said rubber discs, a stub shaft secured to said metal disc and extending through the disc having the opening through the center thereof, a U-shaped member secured to the inside of said hollow base member diametrically opposite the major leg of the J-shaped slot, a lever pivoted at one end to the legs of said U-shaped member and extending through and beyond the J-shaped slot in the wall of said hollow base member, pivotal connecting means between the free end of said stub shaft secured to said metal disc and said lever, said pair of rubber discs being bonded together, and a transparent Petri dish of a diameter not less than 100 mm. and of a depth not less than the order of 20 mm. inverted upon the top disc of the pair of rubber discs whereby upon placement of the casement having a bubble producing substance at its joints upon the top of the pair of rubber discs and placing the Petri dish over the casement with the rim of the dish seated against the top of the rubber disc and pulling down on the lever to lock the lever in the short hook of the J-shaped slot the rubber discs are deformed to create a pressure drop in the area defined within the Petri dish and rubber disc whereby the pressure outside the casement is lower than the pressure inside the casement causing a bubbling action on the casement about the leak area should any leak occur.

References Cited in the file of this patent
FOREIGN PATENTS

| | | |
|---|---|---|
| 302,970 | Switzerland | Jan. 17, 1955 |
| 332,213 | Switzerland | Oct. 15, 1958 |